United States Patent [19]
Dickhaus

[11] Patent Number: 5,423,462
[45] Date of Patent: Jun. 13, 1995

[54] LUGGAGE CARRIER FOR/ON A TWO-WHEELED VEHICLE

[76] Inventor: Reiner Dickhaus, Raiffeisenstrasse 5, D-4790 Paderborn, Germany

[21] Appl. No.: 108,677
[22] PCT Filed: Feb. 21, 1991
[86] PCT No.: PCT/EP91/00328
  § 371 Date: Aug. 19, 1993
  § 102(e) Date: Aug. 19, 1993
[87] PCT Pub. No.: WO92/14642
  PCT Pub. Date: Sep. 3, 1992

[30] Foreign Application Priority Data
Feb. 21, 1991 [WO] WIPO ............... PCT/EP91/00328

[51] Int. Cl.$^6$ .................................................. B62J 1/28
[52] U.S. Cl. ..................................... 224/31; 224/32 A
[58] Field of Search .................... 224/31, 32 A, 42.01

[56] References Cited
U.S. PATENT DOCUMENTS

| | | | |
|---|---|---|---|
| 615,756 | 12/1898 | Shackelton | 224/31 |
| 3,873,127 | 3/1975 | McNichol, Jr. et al. | |
| 4,367,829 | 1/1983 | Kusz | 224/31 |
| 5,234,143 | 8/1993 | Mahvi | 224/31 |

FOREIGN PATENT DOCUMENTS

| | | | |
|---|---|---|---|
| 0051041 | 5/1941 | France | |
| 2574040 | 6/1986 | France | |
| 2091176 | 7/1981 | United Kingdom | 224/31 |

Primary Examiner—Renee S. Luebke
Attorney, Agent, or Firm—Browdy and Neimark

[57] ABSTRACT

A luggage carrier for use on a two-wheeled vehicle, having a container with two compartments forming a wheel housing which extends on both sides of a wheel of the vehicle. The container is secured on a first end to a frame of the vehicle and supported on a second end by the wheel hub of the vehicle. An opening at a top of the container is sealed by a lid, the lid (7) forming a seat back, a shell edge (8) of the seat back seated on a first horizontal pivoting shaft (9) of a guide fitting (10). The guide fitting (10) is pivotably engaged to the container on a second horizontal pivoting shaft (11). The seat back is pivotable out of a closed position into an upright open position on the shell edge (8) around the first horizontal pivoting shaft (9). When the seat back is in the upright open position it is further pivotable around the second horizontal pivoting shaft (11) into a child seat by means of a guide fitting (10) into a higher position above the opening (6) and onto the wheel housing (2).

15 Claims, 11 Drawing Sheets

LUGGAGE CARRIER FOR/ON A TWO-WHEELED VEHICLE

BACKGROUND OF THE INVENTION

1. Technical Field of the Invention

The invention relates to a luggage carrier for/on a two-wheeled vehicle, having a container with two compartments located on both sides of a wheel case and extending on both sides of a wheel, and secured on one side to a vehicle frame and supported on the other in the wheel hub region, and whose container opening, which is at the top, is sealed by a lid.

2. Summary and Objectives of the Invention

The object of the invention is to improve a luggage carrier designed in the manner mentioned at the outset and known in this species from German Utility Model DE-GM 87 09 070 such that the luggage carrier can easily be converted to a safe child seat, in which process the position of the lid is changed simply with respect to the container, and securely fixed in the seat position.

In connection with this convertability into a child seat, the luggage carrier is intended to a) have a container embodied in a stable manner;
b) permit a variable fastening to various two-wheeled vehicles;
c) effect a secure upright position of the parked two-wheeled vehicle;
d) have a simply designed, easy-to-handle and safe belt lock for different safety belts disposed on and to be secured to the luggage carrier and seat;
e) have a lock that cooperates with a security cable of variable length to safeguard against theft; and
f) have a weatherproof canopy that can be simply and detachably secured to the luggage carrier and protects the child against outdoor elements while providing good ventilation with the child seat.

The luggage carrier of the invention offers a large receiving and stowing capacity for items of all kinds, both in its hollow space as well as on its lid, and can be easily converted by simple means into a child seat, wherein the lid in the form of a seat shell is securely fixed with respect to the container by means of support and bearing surfaces, a safety fitting and tension belts.

The load forces of the seat are introduced and distributed into the container over a large surface, via the support and bearing surfaces, the fitting and the belts.

Moreover, the advantageously disposed stand can be seated to pivot with little effort into the respective position on the container, exhibits a simple securing to the container when not in use and a highly advantageous support position when in the upright position, and in this way the load forces are likewise introduced into the container side walls over a large surface and distributed.

Furthermore, the belts are equipped with simple, easy-to-handle and extremely safe belt locks (belt straps and fitting elements into which these are inserted), and the luggage carrier is equipped with a safe and practical lid lock and detachable weatherproof canopy.

An exemplary embodiment of the invention is shown in the drawings and explained in further detail below. The drawings show in:

DESCRIPTION OF THE PREFERRED EMBODIMENTS(S) OF THE INVENTION

Figure 1:
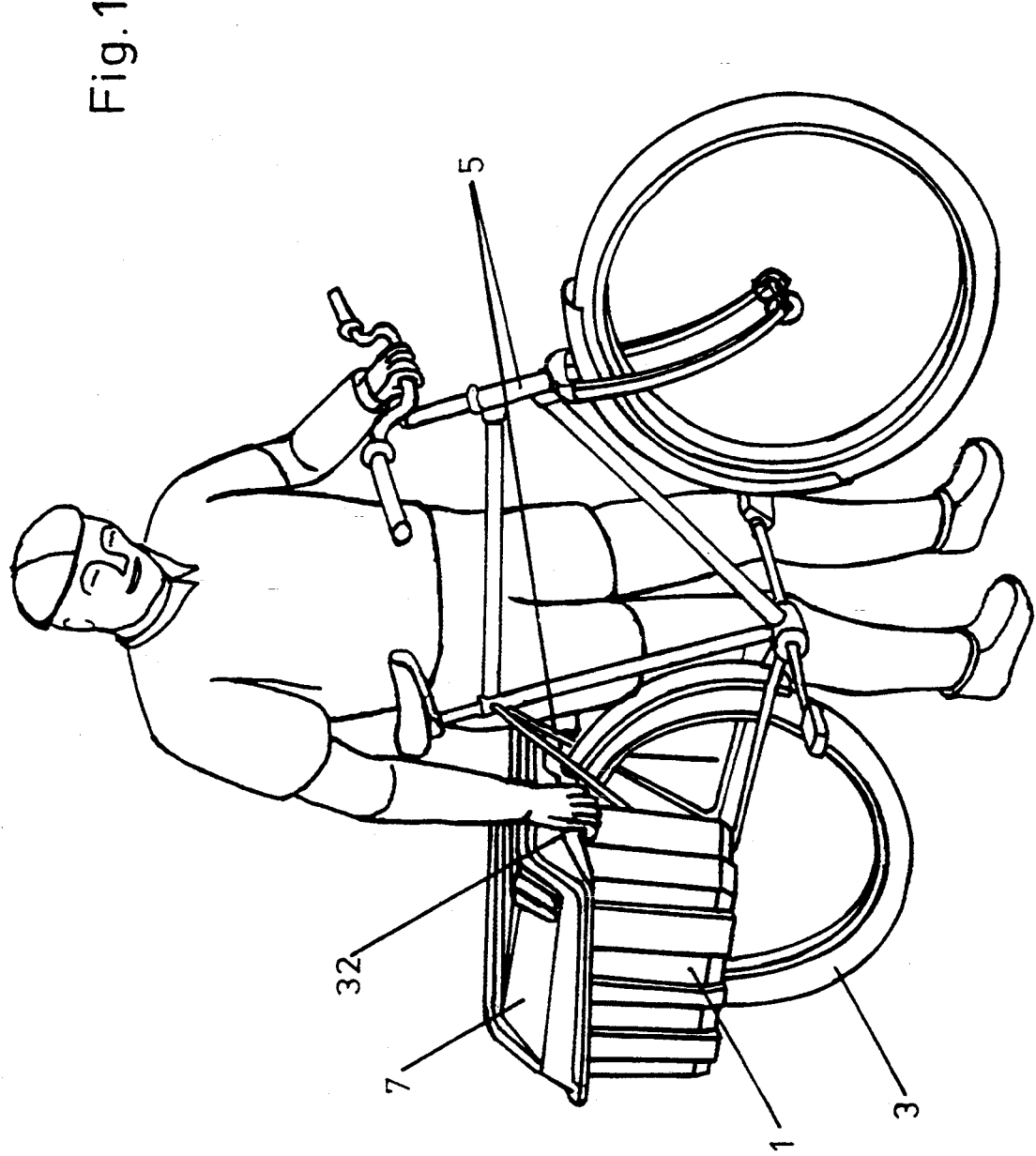
FIG. 1 a representation in perspective of a two-wheeled vehicle with a luggage carrier that is being carried by a person.

As shown in the drawings, the luggage carrier for/on a two-wheeled vehicle has a container (1) with two compartments (4) located on both sides to form wheel housing (2) and extending on both sides of a wheel (3), and secured on one side to a vehicle frame (5) and supported on the other in the wheel hub region; the container opening (6), which is at the top, is sealed by a lid (7).

Figure 3:
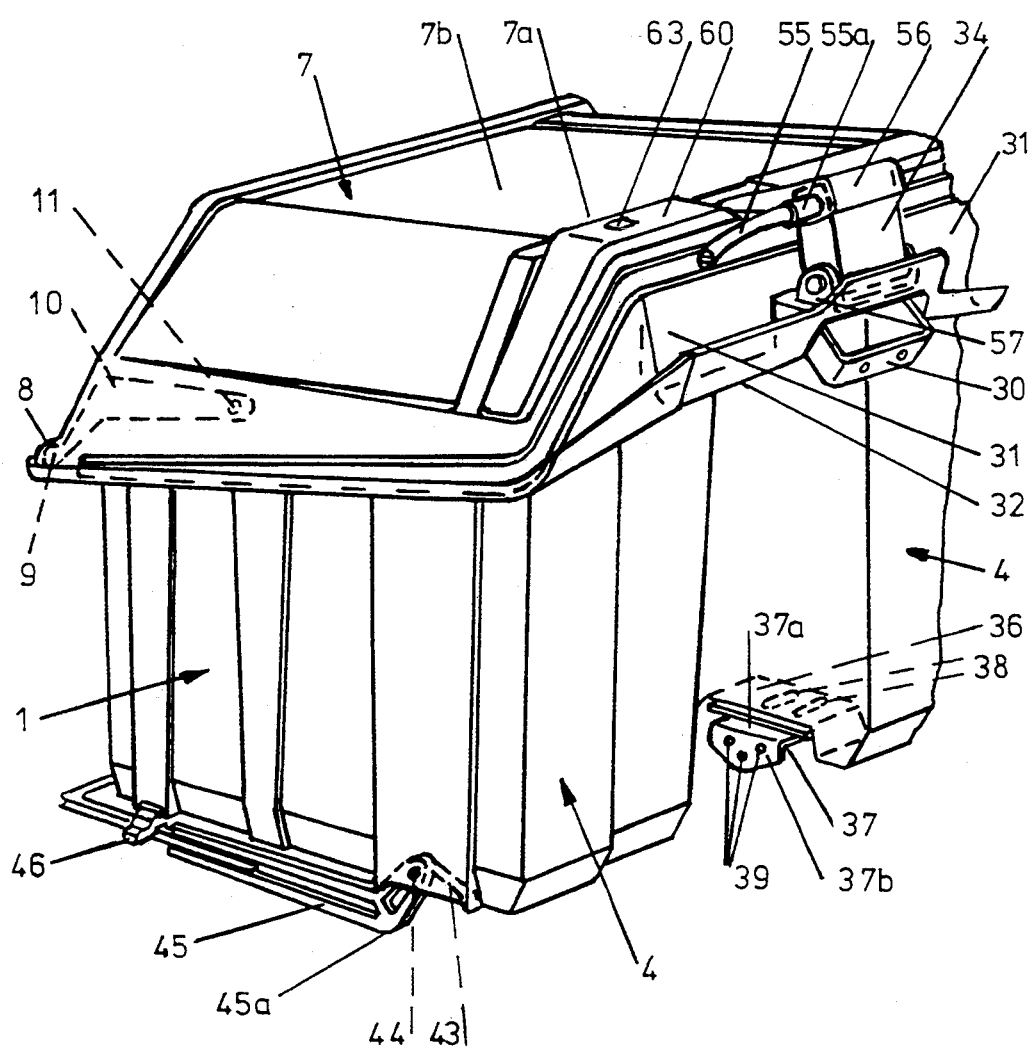
FIG. 3 a representation in perspective of the luggage carrier with a closed lid.
Figure 4:
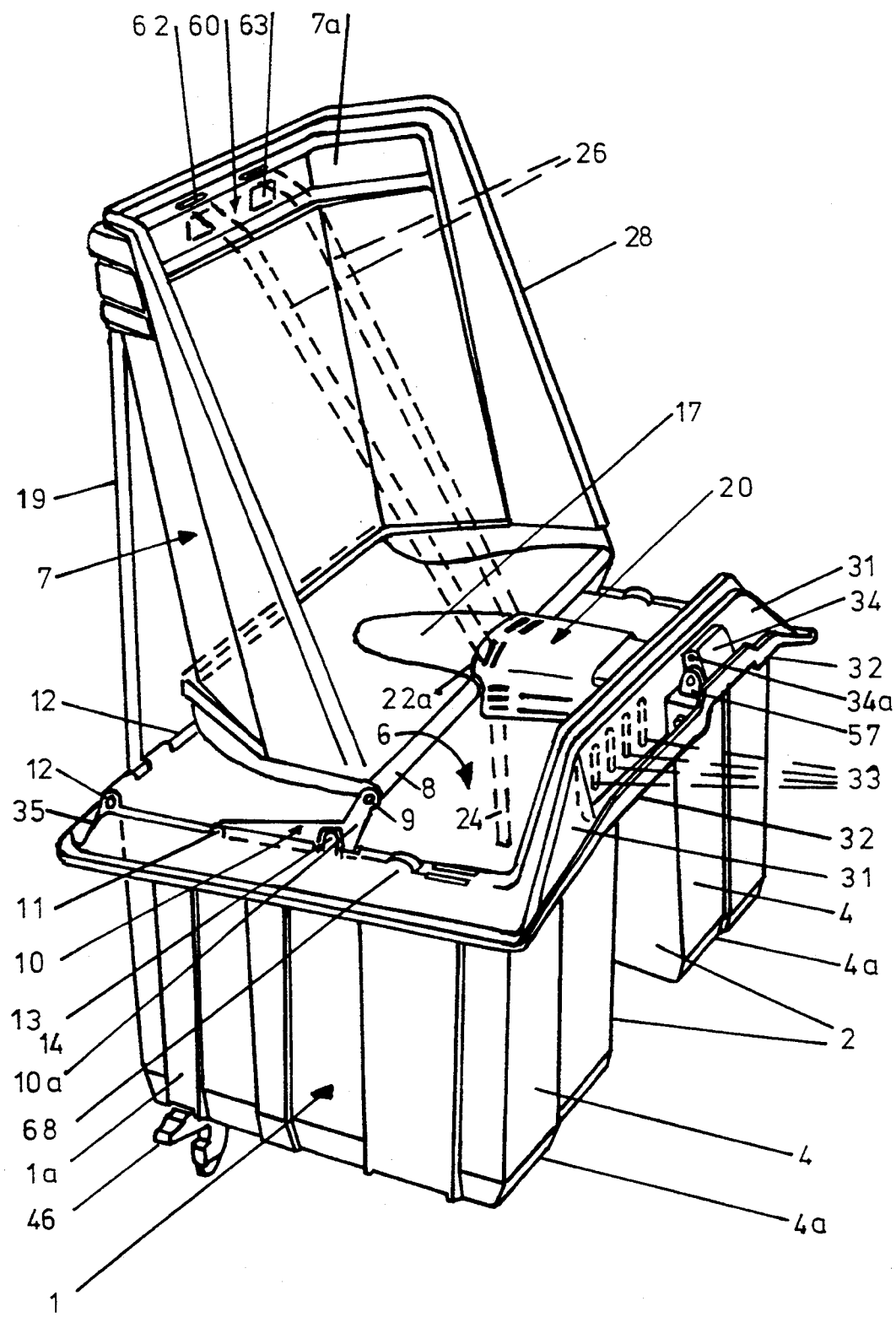
FIG. 4 a representation in perspective of the luggage carrier with the lid pivoted upwardly to form a child seat.

The lid (7) is embodied as a seat shell and is seated with a shell edge (8) on a first horizontal pivoting shaft (9) of a guide fitting (10) to pivot out of the closed position (FIG. 3) into an upwardly-pivoted, open position and, from this position by means of this fitting (10), is pivotable as a child seat about a second horizontal pivoting shaft (11) into the upwardly-pivoted position above the container opening (6) on the wheel housing (2), as shown in FIG. 4 and further explained below. The seat shell is supported in this position in a fixed manner by means of the guide fitting (10) and wheel case (2).

Figure 5:
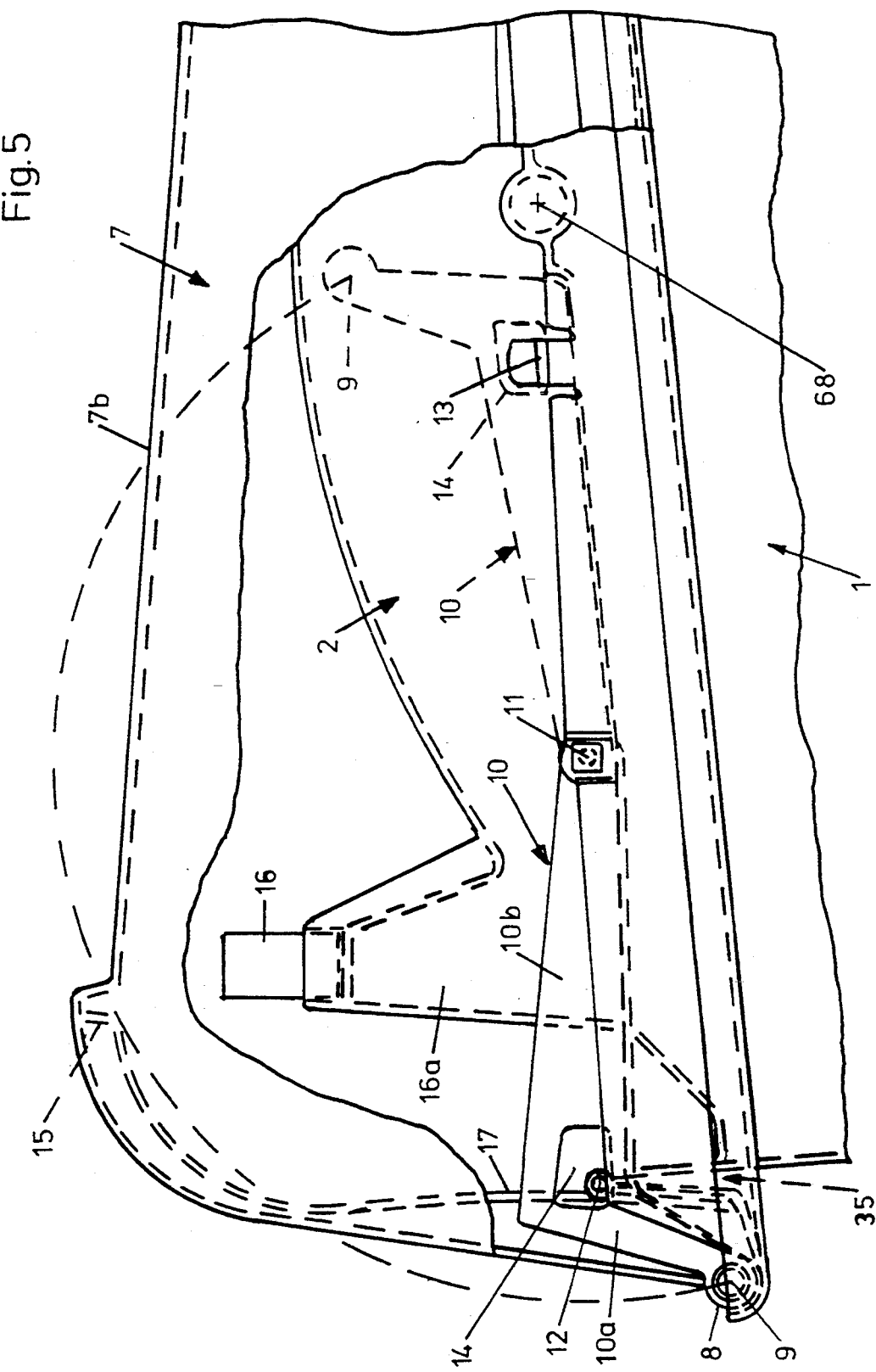
FIG. 5 a side view of a partial region of the closed lid of the luggage carrier with a guide fitting for pivoting the lid.
Figure 6:
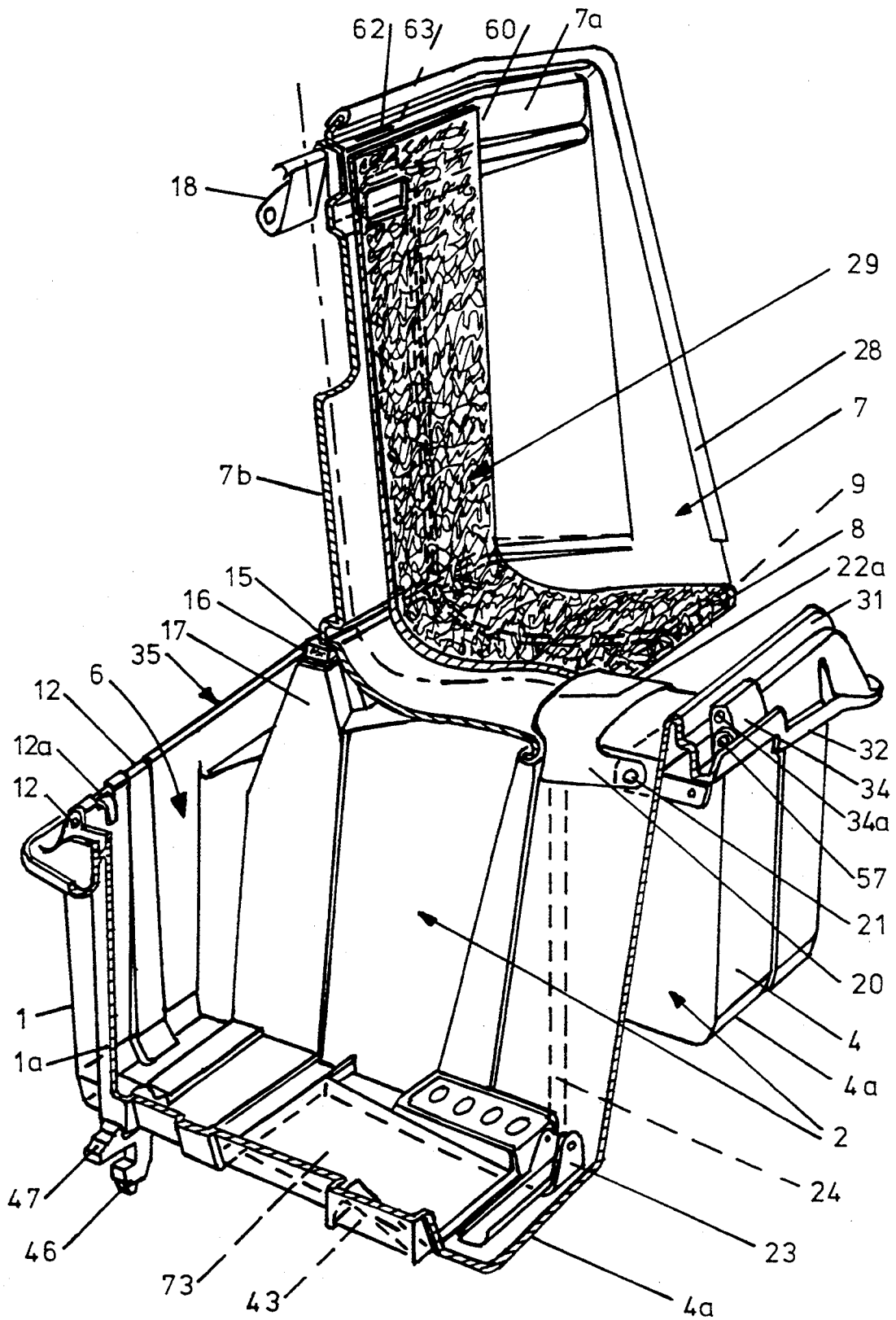
FIG. 6 a representation in perspective of the luggage carrier comprising the container and lid pivoted upwardly to form a child seat, partly cut away.

The guide fitting (10) is held fast in both pivoted positions with respect to the container (1). Thus, in the closed position of the lid fitting is held (7) by means of a stay bar (12) for pivoting the lid (7) upwardly and downwardly, and in the upwardly-pivoted seat position of the lid (7) by locking means (12, 13, 14) (FIGS. 4 through 6).

Figure 7:
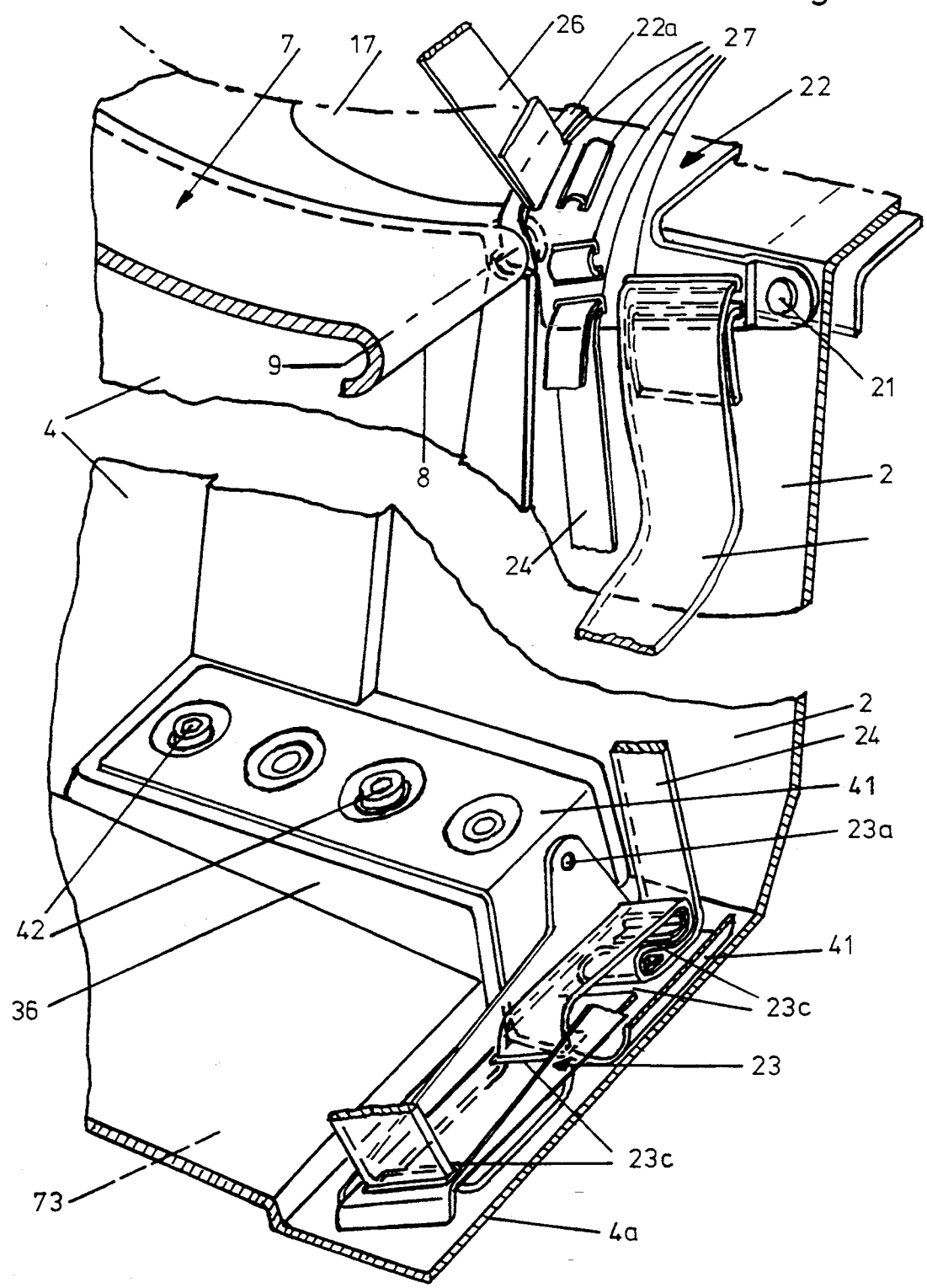
FIG. 7 a section in perspective of the container with a part of the upwardly-pivoted lid, lid safety fitting and child safety belt, foot support belt and fastening belt for the safety fitting.

The guide fitting (10) has two lateral bell cranks with crank arms (10a, 10b) at an obtuse angle to one another and of different lengths. The shorter crank leg (10a)

receives in its free end the pivoting shaft (9) for the lid (7). The longer crank (10b) is pivotably seated with the free end engaged to the second pivoting shaft (11). Which is engaged in the upper lateral edge of the container (1). In the abutting region of the two crank legs (10a, 10b) is a recess (14), which is engaged in one position by the displaceable stop bar (12) that is secured in both displaced positions by means of at least one safety lever (12a) (FIG. 6). In the second position recess (14) engages latches (13) formed on the container (1) (FIG. 5). In the seat position, the lid (7) is supported as shown in FIGS. 4 through 6 on a flexible and/or resilient support block (16) supported by a protrusion (16a) of the wheel housing (2) on the side of the backrest, and with a protrusion (17) on the wheels housing (2) on the side of the seat surface. When the the lid (7) is pivoted upwardly into the seat position it is in position with respect to the container (1) (FIGS. 2, 4) by means of two outer tension belts, which are secured by one end below the bottom (4a) of the compartments (4) and are detachably inserted with belt straps (18) into fitting elements (60) secured to the upper seat back edge (7a) of the lid (7), and by means of a safety fitting (20) pivotably seated on the wheel housing (2) and overlapping the edge (8) on the side of the seat surface. The safety fitting (20) shown in FIGS. 2, 4, 6 and 7 is embodied as a U-shaped rocking lever (22) that is upwardly pivotable about a horizontal shaft (21) in the wheel housing (2), with a safety catch (22a) formed at its free end that acts upon the edge (8) of the seat. First, two lateral safety belts (24) of the fitting (20) that are detachably insertable into belt buckles (23) on the bottom (4a) of the compartment are disposed on the rocking lever (22) in its outwardly-pivoted position on the edge (8) of the seat. Secondly, two lateral foot support belts (25) are secured in the outer side walls of the container. Thirdly, two safety belts (26) disposed parallel or crosswise with respect to the belt fitting elements (60) are disposed on the upper edge (7a) of the backrest of the lid (7) and are insertable therein with belt straps (18) for the received child. For their three functions, these belts (24, 25, 26), are looped respectively with a long end several times through slits (27) of the rocking lever (22), and in this way are fixed in a longitudinally adjustable manner (FIG. 7).

Each fitting element (60) and the belt straps (18) cooperating with it and that are detachably insertable into it form counterparts of a belt lock. The belt buckle (23) of the fitting-safety belt (24) is embodied as a turnbuckle and has a tension lever (23b) that is pivotable about an axis (23a). The belt end is looped several times into the turnbuckle through slits (23c). The tension lever (23b) and the belt (24) are brought around its axis (23a), through a dead center position and into the taut position (FIG. 7).

A sealing joint (28) is disposed around the edge of the lid (7), as far as the edge (8) of the seat, and an upholstered mat (29) is removably placed into the seat shell (7) (FIG. 6) and is fixed by clamping between the wheel housing (2) and the safety fitting (20) and safety catch (22a) to avoid possible points of injury and to form a seamless transition to the safety fitting (20).

On its side adjacent to the frame fastening, the container (1) has an upswept, front transverse bridge (31), carrying handles (32), ventilation slits (33) and a fastening point (30) on the frame (5) and for a lock (34), and has on its opposite side a lower-lying, rear transverse bridge (35), on which the lid (7) is supported in the closed position by the edge (8) of its seat, exhibiting the shaft (9) (FIGS. 3 through 6).

Figure 8:
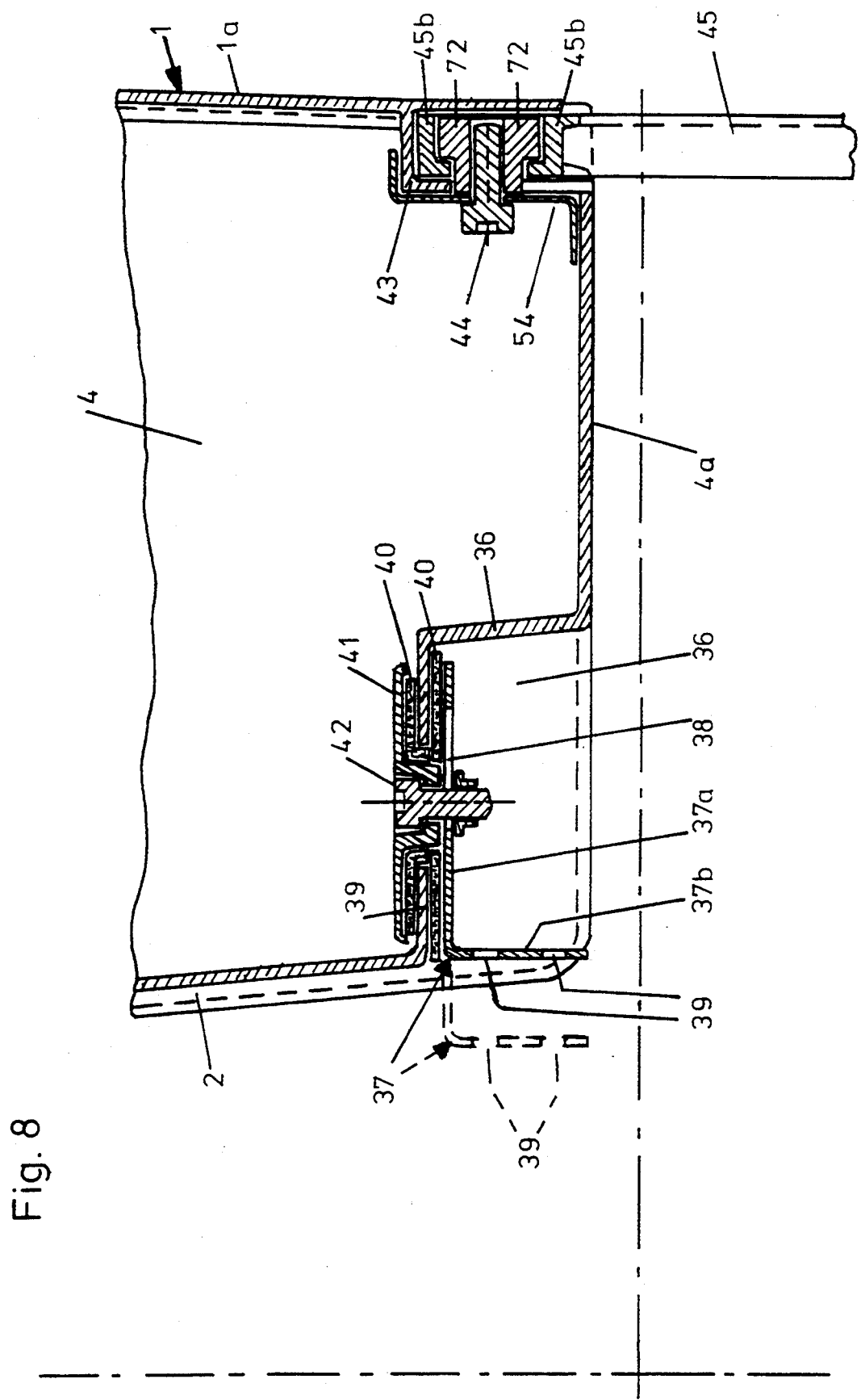
FIG. 8 a cross-section through the lower region of a compartment with a fastening point on the part projecting from the frame and stand.

An angle bracket (37) for fastening the container (1) to the projection of the vehicle frame (5) is respectively disposed in a recess (36) of the bottom (4a) of both compartments (4) and, for the purpose of compensating for varying axis lengths, is variably adjustable in the hub-axle direction by its horizontal leg (37a), located under the bulge (36), by means of an elongated hole (38) and a fastening screw (42) engaging it. In its vertically downward-oriented leg (37b), has a plurality of through holes (39) for a fastening screw on the projection (FIGS. 3 and 8). The holes (39) in the vertical leg (37b) form a hole pattern for fastening to different projections.

As FIG. 8 shows, the angle bracket (37) is fixed in the recess (36) by its horizontal leg (37a), with the interposition of damping layers (40) on either side of the recess wall (36a) and a large-surface counterplate by means of the screw (42), creating a large-surface force distribution.

The tension lever (23b) of the fitting-safety belt (24) can also be seated on this counterplate (41).

Figure 2:
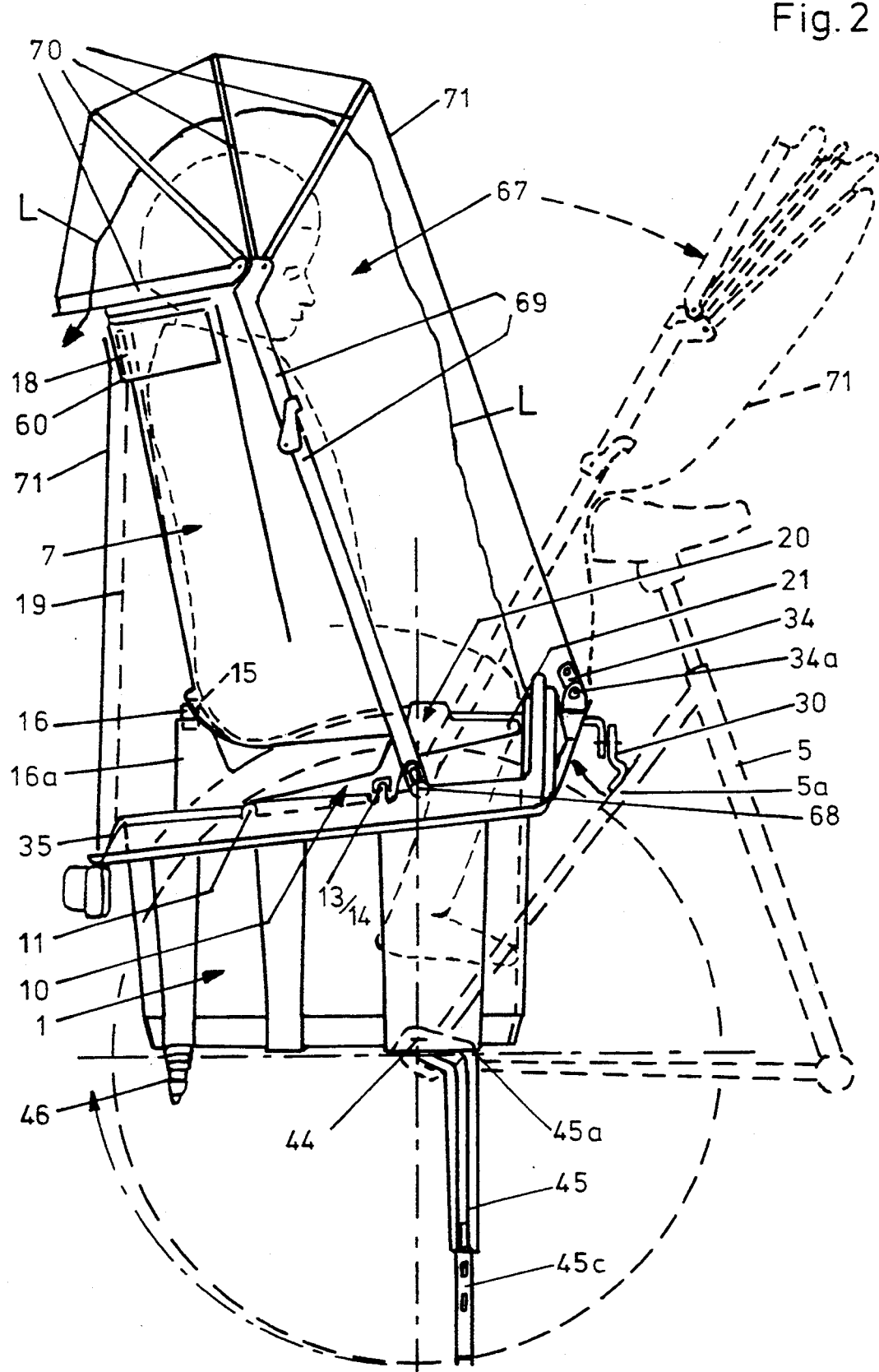
FIG. 2 a side view of the luggage carrier secured to the vehicle above the rear wheel in the converted form of a child seat.

A U-shaped stand (45) is seated in a recess (43) on the bottom side of the two container side walls (1a) to pivot about an axis (44) extending coaxially to the wheel axle, and has, following its pivot axis (44), a U-bend (45a) that keeps the stand (45) at a distance from the wheel axle in the downwardly-pivoted position of the stand (upright position of the bicycle) and is supported in the recess (43), and in the upwardly-pivoted, not-in-use position, engages a resiliently seated locking hook (46) with a foot-operated neck (47) (FIGS. 2, 3 and 8).

Figure 9:
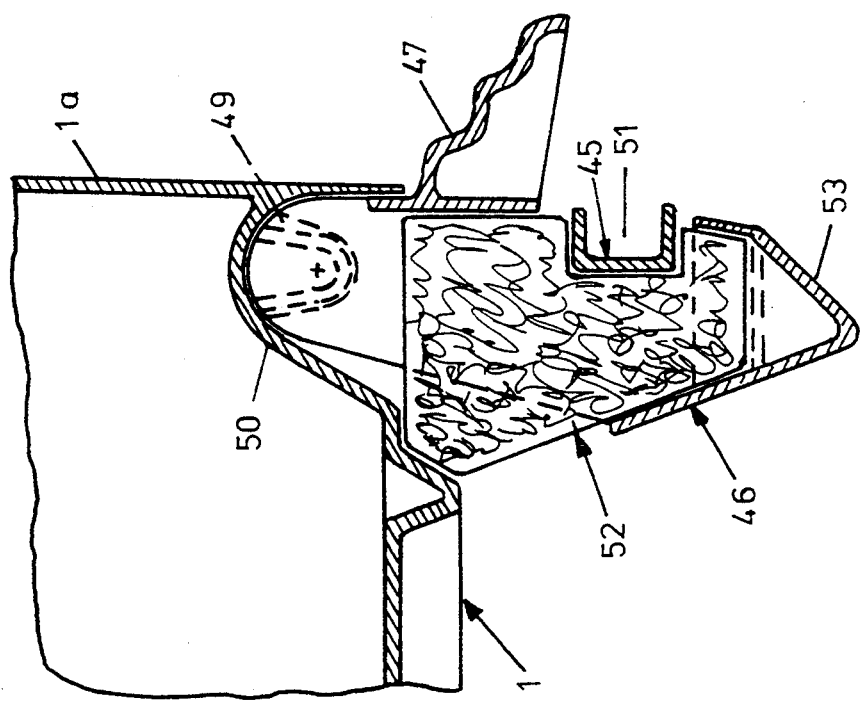
FIG. 9 a cross-section through a locking hook for a stand, which is located on the outside of the container, in the position of the stand in which it is pivoted into the locking hook.
Figure 11:
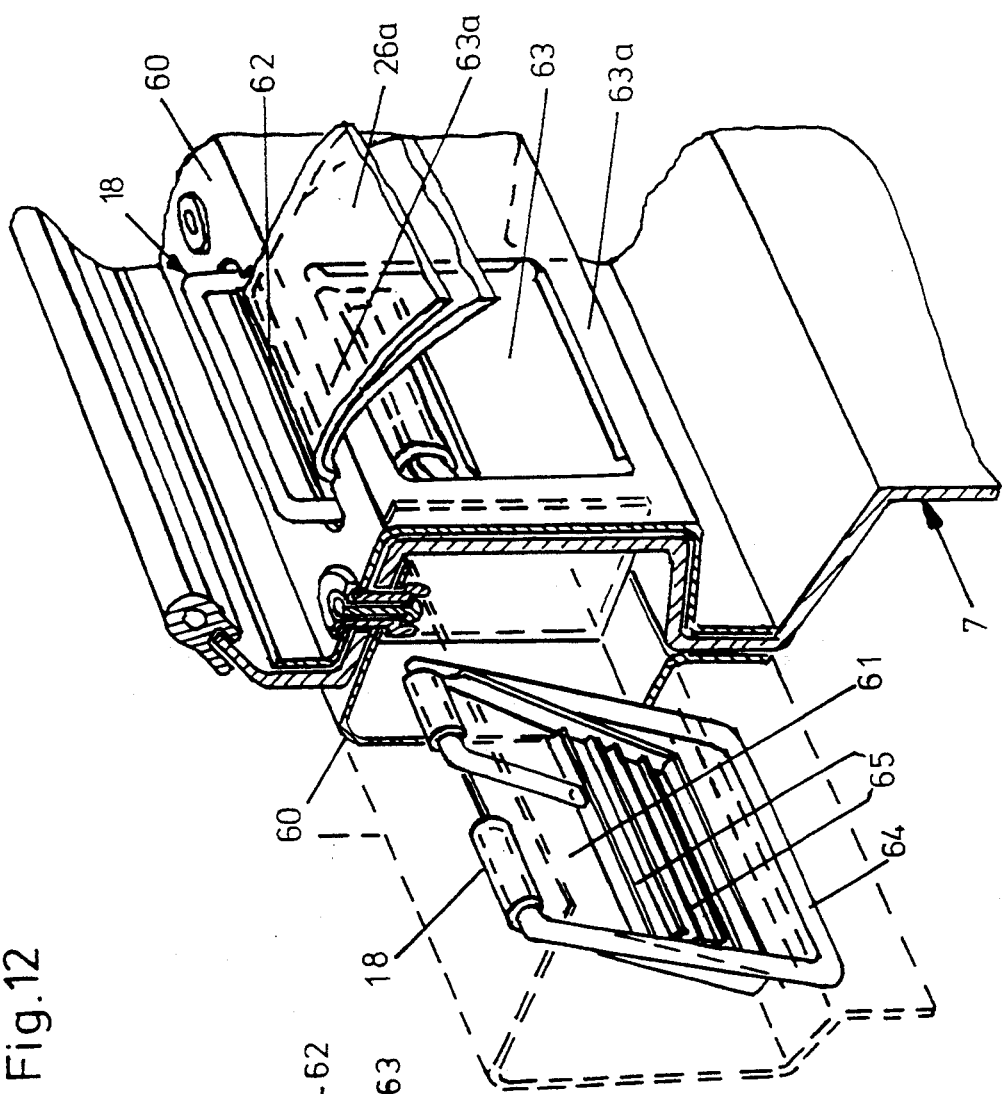
FIG. 11 a sectional representation in perspective of a belt lock with a belt strap inserted from below.
Figure 12:
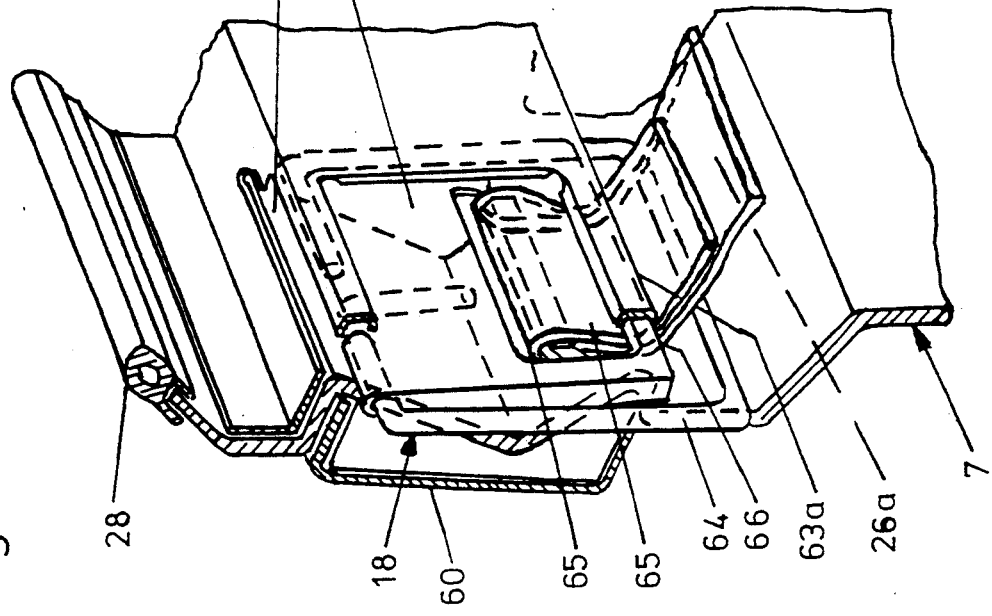
FIG. 12 a sectional representation in perspective of a belt lock with a belt strap inserted from above.
Figure 14:
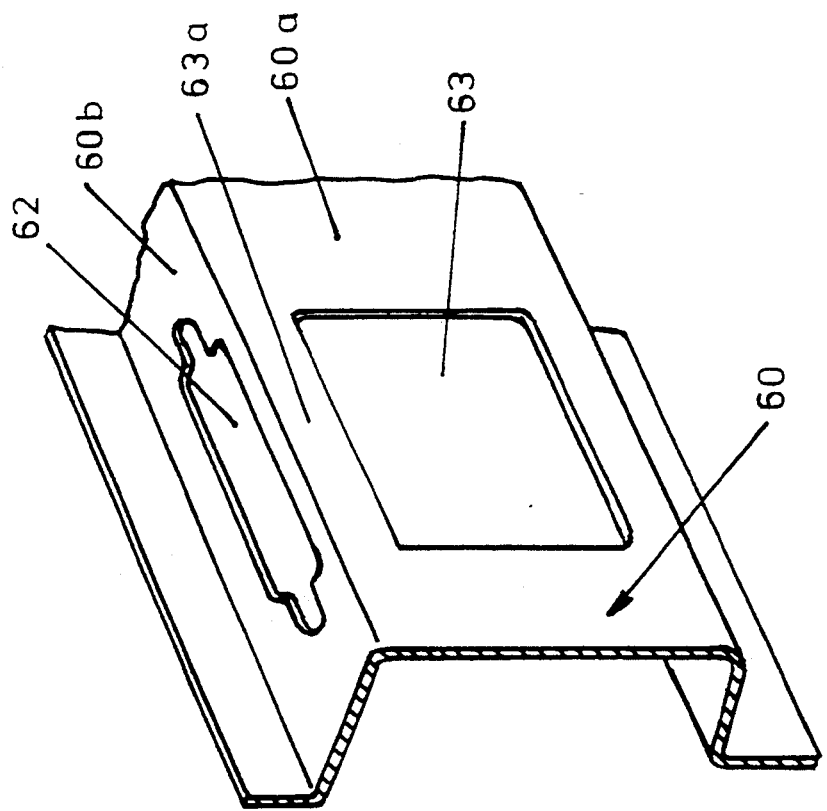
FIG. 14 a representation in perspective of the fitting element that receives the belt strap.
Figure 13:
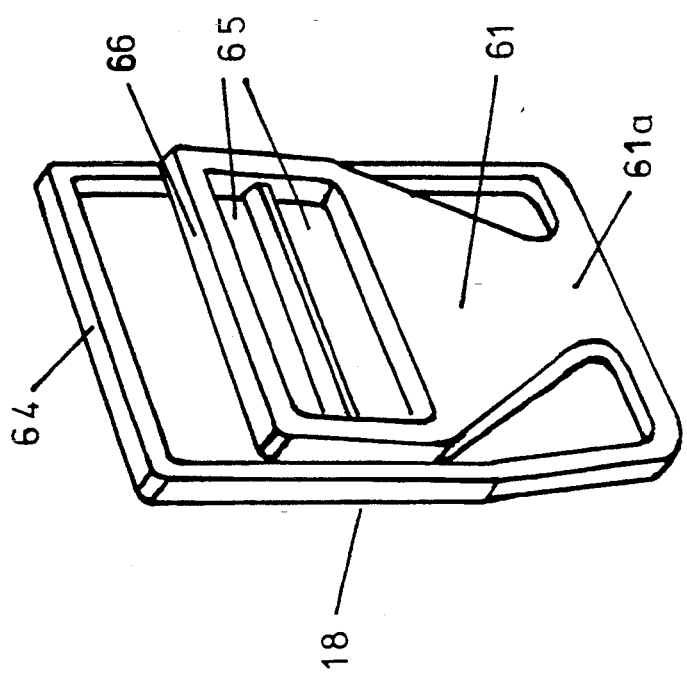
FIG. 13 a representation in perspective of the belt strap.

As shown in FIG. 9, the locking hook (46) with the foot-operated neck (47) is formed by a one-piece plastic part that engages a recess (49) of a protrusion (50) of the container (1) with a latch (48) and is pivotably and resiliently held in a specific region about this locking connection (48, 49). The locking hook (46) is lined at least in its locking groove (51) that receives the stand (45) with a damping layer (52), such as a rubber piece. A run-up ramp (53) formed on the locking hook (46) permits easy engagement of the stand (45) into the locking groove (51), in that the upwardly-pivoted stand (45) pushes the locking hook (46) back via the ramp (53), which in turn then automatically pivots back via the stand (45) pivoted into the locking groove (51) because of its pivotable and resilient embodiment.

Figure 10:
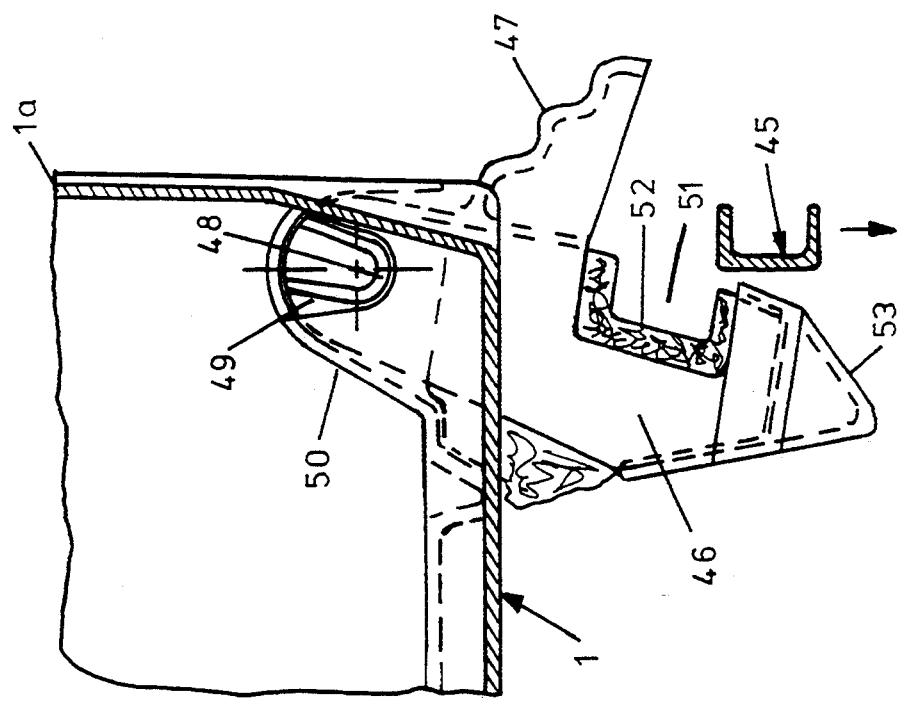
FIG. 10 a cross-section through the same locking hook with the stand released.

As shown in FIG. 10, to release and pivot the stand (45) downwardly, pressure is exerted on the neck (47) by the foot, by means of which the locking hook (46) is again pushed back, releasing the stand in its locking groove (51).

As can be seen from FIG. 8, a slider (72) that is engaged by the screw (44), and around which the stand (45) is seated with a large surface, absorbing the occurring forces, is inserted in a rotatable and laterally guided manner into the stand bearing eyelet (45b).

A sheet metal bracket extending across the recess (43) and on the bottom (4a) of the compartment, penetrated by the screw (44) and pressed against the protrusion (43) distributes the load forces across a large surface. As shown in FIG. 2, the stand (45) is embodied to be infinitely variably adjustable in height in that its lower U-bolt (45c) is displaceable, in relation to the stand parts (45, 45a) on the side of the pivoting axis, and can be fixed in place by means of screws, socket pins, clamping elements or the like.

The lock (34), which is visible in FIGS. 3, 4 and 6, is formed by a safety lock with an insertion conduit (34a) for a—locking pin (55a) of a security cable (55) at the end, and the locking pin (55a) at the same time penetrates a lock flap (56) of the lid (7).

As seen in FIGS. 2-4 and 6, lock (34) is pivotably seated in a U-shaped bearing cap (57) secured to the frontal transverse bridge (31). In the closed position of the lid (7), its lock flap (56) is placed over the lock (34), and the locking pin (55a) then laterally engages the lock (34) through the lock flap (56), and then the locking pin (55a) is set in place by means of closing the lock (34). The security cable (55) is of an arbitrarily variable length, and can be selectively looped around and through the luggage carrier and the vehicle and around a stationary point (a tree, signpost or the like) for security. The cable end remote from the locking pin (55a) is guided through under the wheel housing (2) and secured below in a manner not accessible from the outside.

An angle bracket (30) for securing the container (1) to the frame (5), by means of screws or the like, preferably to the frame tube (5a) extending diagonally downward to the wheel hub and the projection, is secured to the frontal transverse bridge (31), under the lock seating (57).

The belt lock (18, 60) in accordance with FIGS. 11 through 14 comprises a belt strap (18) with a resilient holding and locking element (61) for the belt end (26a), a fitting element (60) with an insertion opening (62) for the belt strap (18) and a recess (63), which forms a locking edge (63a) for the holding and locking element (61) and an actuating opening for releasing the holding and locking element (61).

The belt strap (18) is embodied in one piece of metal or plastic, and has in a part (64) of the frame the holding and locking element (61) resiliently connected thereto, which has a plurality of through guiding slits (65) for the belt end (26a) and a locking edge (66), protrudes diagonally out of the plane of the part (64) of the frame, and can be moved inside the part (64) of the frame for releasing the belt strap (18) from the fitting element (60).

The fitting element (60) is formed from a flat, U-shaped profile of sheet metal or plastic; the actuating opening (63) is recessed in slit form into its U-rib (60a), and the insertion opening (62) is recessed in the shape of a slit into a U-leg (60b). The profile rib provided between the actuating opening (63) and the insertion opening (62) produces the locking edge (63a) for the holding and locking element (61). The fitting element (60) is lengthened until it reaches into the side walls of the seat shell (7), as shown in FIG. 4, by means of which it provides a reinforcement of the lid (7) and secures it against possible upward bending, damage and thus theft.

The belt strap (18) with the belt end (26a) that has been looped repeatedly through the slits (65) is inserted from below or above into the slit-shaped insertion opening (62) of the fitting element (60) and in the course of this the projecting holding and locking element (61) is pushed around its resilient connecting rib (61a) toward the part (64) of the frame and into the part (64) of the frame. Once the belt strap (18) is inserted, the holding and locking element (61) springs automatically into the opening (63) of the fitting element (60), and its locking edge (63a) comes to rest in front of the locking edge (63a) of the fitting element (60); the inserted belt strap (18) is also held securely in the fitting element (60), even under a high tensile load.

To release the belt lock, a pressure is exerted by hand onto the holding and locking element (61); the lock is pushed into the part (64) of the frame and hence pushed away from the locking edge (63a), across the resilient region (61a), so that the belt strap (18) can then be pulled out of the slit (62) of the fitting element (60).

As shown in FIG. 2, a collapsible weatherproof canopy (67) is detachably connectable to the container (1) and the lid (7) when the lid is pivoted into the seat position; it has two collapsible side rods (69) that can pivotably engage pivot bearings (68) formed in the side walls (1a) of the container (1), has supports (70) pivotably seated on the side rods and that can be opened, and a flexible canopy (71) that is secured to the supports (70) and extends down to the frontal bridge (31) which, with the ventilation slits (33) provided in the bridge (31) and the upper edge (7a) of the backrest, produces circulating air flow (L).

A recess (73) (FIG. 6) into which a battery pack (not shown) can be inserted can be provided under the compartment(s) (4).

The lid (7) can have a flat surface (7b) (see FIG. 3) on the outside, on which items such as beer or soft-drink cases can be placed and secured during transport by means of tension belts.

To convert the luggage carrier into a child seat, the lock (34) is opened, and the lid (7) is grasped by its front end and pivoted upwardly about the horizontal shaft (9), so that it is positioned at the front of the rear transverse bridge (35) and points diagonally upward.

Then the lid (7) with the guide fitting (10) is pivoted forward (to the frontal transverse bridge (31)) about the horizontal shaft (11) on a circular arc (see the dash-line arc in FIG. 5), so that it is then supported as an upright seat shell, in accordance with FIG. 4, on the wheel case (2) and the rear rubber bumper (16). Now the safety fitting (20) is pivoted downwardly and secured by the belts (24) by means of the tension buckles (23).

Then the child can be placed into the seat shell (7) and secured by the belts (26). The foot support belts (25) reach their support position when the fitting (20) is closed, and the child can rest its feet on the belts (25), which form loops.

I claim:

1. A luggage carrier for use on a two-wheeled vehicle, comprising:
    a container with two compartments forming a wheel housing which extends on both sides of a wheel of said vehicle, said container being secured on a first end to a frame of said vehicle and supported on a second end in a wheel hub region of said vehicle,
    an opening at a top of said container sealed by a lid, said lid (7) forming a seat back,
    a shell edge (8) of said seat back seated on a first horizontal pivoting shaft (9) of a guide fitting (10),
    said guide fitting (10) pivotably engaged to said container on a second horizontal pivoting shaft (11),
    said seat back pivotable out of a closed position into an upright open position on said shell edge (8) around said first horizontal pivoting shaft (9),
    said seat back when in said upright open position being further pivotable around said second horizontal pivoting shaft (11) into a child seat by means of said guide fitting (10) into a higher position above said opening (6) and onto said wheel housing (2), and said seat back in said higher position supported in a fixed manner by means of said guide fitting (10) and said wheel housing (2).

2. The luggage carrier as defined by claim 1, wherein said guide fitting (10) is respectively held fast with respect to said container (1) in a closed position of said lid (7) by means of a stay bar (12) for pivoting said lid (7) upwardly and downwardly, and in said child seat position of the lid (7) by means of locking means (13, 14).

3. The luggage carrier as defined by claim 1, wherein said guide fitting (10) has two crank arms (10a, 10b) at an obtuse angle to one another and of different lengths, a shorter crank arm (10a) of said crank arms receives in a free end said first horizontal pivoting shaft (9), and a free end of a longer crank arm of said crank arms (10b) is pivotably seated on said second horizontal pivoting shaft (11) in an upper lateral edge of the container (1); a recess (14) being provided in an abutting region of said crank arms (10a, 10b) which is engaged in one position by a displaceable stop bar (12), which is secured in both displaced positions by means of at least one safety lever (12a), and said recess in a second position engages latches (13) formed on the container (1).

4. The luggage carrier as defined by claim 1, wherein an angle bracket (37) for fastening the container (1) to a projection of the vehicle frame (5) is respectively disposed in a recess (36) in a bottom (4a) of said two compartments (4), and, for the purpose of compensating for varying axis lengths, is adjustable in the hub-axle direction by a horizontal leg (37a), located under the recess (36), by means of an elongated hole (38) and a fastening screw (42) engaging said horizontal leg, said angle bracket having a vertically downward-oriented leg (37b), which has a plurality of through holes (39) for a fastening screw on the projection, the holes (39) in the vertical leg (37b) forming a hole pattern for fastening to different projections.

5. The luggage carrier as defined by claim 1, wherein a U-shaped stand (45) that is adjustable in height is seated in a recess (43) on a bottom side of two container walls (1a) to pivot about an axis (44) extending coaxially to the wheel axle, and has, following the pivot axis (44) of said stand, a U-bend (45a) that keeps the stand (45) at a distance from the wheel axle in the downwardly-pivoted position of the stand when the bicycle is in an upright position and is supported in the recess (43), and in an upwardly-pivoted, not-in-use position, engages a resiliently seated locking hook (46) having a foot-operated neck (47).

6. The luggage carrier as defined claim 1, wherein the lid (7) has a flat surface (7b) on the outside for items to be transported.

7. The luggage carrier as defined claim 1, wherein said lid (7) is supported in said child seat position with a protrusion (15) on a side of the seat back on a flexible and resilient support block (16) supported by a first protrusion (16a) of said wheel housing (2) and with a second protrusion (17) on said wheel housing (2) on a side of a seat surface; and by two outer tension belts (19) that are removably insertable into belt lock fitting elements (60) secured under a bottom (4a) of the two compartments (4) and in the upper edge (7a) of the seatback of the lid (7), and by a safety fitting (20) pivotably seated on the wheel housing (2) and overlapping the edge (8) on the side of the seat surface.

8. The luggage carrier as defined by claim 7, wherein a sealing joint (28) is disposed around an edge of the lid (7), as far as the edge (8) of the seat back, and an upholstered mat (29) is removably placed into the seat back (7) and is fixed by clamping between the wheel housing (2), the safety fitting (20) and safety catch (22a) to avoid possible points of injury and to form a seamless transition to the safety fitting (20).

9. The luggage carrier as defined by claim 7, characterized in that the safety fitting (20) is embodied as a U-shaped rocking lever (22) that is upwardly pivotable about a horizontal shaft (21) on the wheel housing (2) with a safety catch (22a) formed at its free end that acts upon on the edge (8) of the seat back, and on which two lateral safety belts (24) of the fitting (20) that are detachably insertable into belt buckles (23) on the bottom (4a) of the two compartments are disposed in the outwardly-pivoted position on the edge (8) of the seat back, as are two lateral foot support belts (25) secured in the outer side walls of the container, and two safety belts (26) disposed parallel or crosswise with respect to the belt fitting elements (60) are disposed on the upper edge (7a) of the seat back of the lid (7) and are insertable therein with belt straps (18) for the received child.

10. The luggage carrier as defined by claim 8, wherein the container (1) has on the first end secured to the frame of the vehicle an upswept, frontal transverse bridge (31), carrying handles (32), ventilation slits (33) and a fastening point (30) on the frame (5) and a lock (34), and has on the second end a lower-lying, rear transverse bridge (35), on which the lid (7) is supported in the closed position of the lid (7) by the edge (8).

11. The luggage carrier as defined by claim 10, wherein the lock (34) is formed by a safety lock with an insertion conduit (34a) for a locking pin (55a) at the end of a security cable (55), wherein the locking pin (55a) at the same time penetrates a lock flap (56) of the lid (7).

12. The luggage carrier as defined by claim 10, wherein a collapsible weatherproof canopy (67) is detachably connectable to the container (1) and the lid (7) when the lid is pivoted into the child seat position, the weatherproof canopy having two collapsible side rods (69) that can pivotably engage pivot bearings (68) formed in side walls (1a) of the container (1), and having supports (70) pivotably seated on the side rods that can be opened, and a flexible canopy (71) that is secured to the supports (70) and extends down to the frontal bridge (31) which, with the ventilation slits (33) provided in the bridge (31) and the upper edge (7a) of the backrest, produces circulating air flow (L).

13. The luggage carrier as defined by claim 9, wherein a belt lock (18, 60) is formed by a belt strap of said belt straps (26) with a resilient holding and locking element (61) for a belt end of said belt straps (26) (26a), a fitting element of said belt fitting elements (60) with an insertion opening (62) for the belt strap (18) and a recess (63), which forms a riblike locking edge (63a) for the holding and locking element (61) and an actuating opening for releasing the holding and locking element (61).

14. The luggage carrier as defined by claim 13, wherein the belt strap (18) is embodied in two pieces of metal or in one piece of plastic, and has in a part (64) formed around the holding and locking element (61) and resiliently connected thereto by means of a resilient rib (61a), which has a plurality of through guiding slits (65) for the belt end (26a) and a locking edge (66), the holding and locking element protruding diagonally out of a plane of the part (64), and moveable to be inside the part (64) for releasing the belt strap (18) from the fitting element (60).

15. The luggage carrier as defined by claim 13, wherein the belt lock fitting element (60) is formed from a flat, U-shaped profile of sheet metal or plastic; the actuating opening (63) is recessed in the shape of a slit into a rib of said U-shaped profile (60a), and the insertion opening (62) is recessed in the shape of a slit into a U-leg (60b) of said U-shaped profile; and that the actuating opening (63) and the insertion opening (62) produces the locking edge (63a) for the holding and locking element (61) in the rib.

* * * * *